(12) United States Patent
Richards et al.

(10) Patent No.: US 10,744,436 B2
(45) Date of Patent: Aug. 18, 2020

(54) PARTICULATE SEPARATOR FOR THE REMOVAL OF LARGE PARTICULATE MATTER FROM VENTILATION SYSTEM AIR STREAMS

(71) Applicant: Air Control Techniques, P.C., Cary, NC (US)

(72) Inventors: John R. Richards, Raleigh, NC (US); Jonas Gilbert, Raleigh, NC (US)

(73) Assignee: Air Control Techniques, P.C., Cary, NC (US)

(*) Notice: Subject to any disclaimer, the term of this patent is extended or adjusted under 35 U.S.C. 154(b) by 238 days.

(21) Appl. No.: 15/891,578

(22) Filed: Feb. 8, 2018

(65) Prior Publication Data
US 2018/0229166 A1    Aug. 16, 2018

Related U.S. Application Data

(60) Provisional application No. 62/457,231, filed on Feb. 10, 2017.

(51) Int. Cl.
| | | |
|---|---|---|
| *B01D 45/00* | (2006.01) | |
| *B01D 45/06* | (2006.01) | |
| *F24F 13/28* | (2006.01) | |
| *B01D 45/04* | (2006.01) | |
| *B01D 45/02* | (2006.01) | |
| *B07B 7/086* | (2006.01) | |
| *B65G 69/18* | (2006.01) | |
| *B65G 69/20* | (2006.01) | |

(52) U.S. Cl.
CPC ............ *B01D 45/06* (2013.01); *B01D 45/04* (2013.01); *F24F 13/28* (2013.01); *B01D 45/02* (2013.01); *B07B 7/086* (2013.01); *B65G 69/18* (2013.01); *B65G 69/20* (2013.01)

(58) Field of Classification Search
CPC ........ B01D 45/06; B01D 45/02; B01D 45/04; F24F 13/28; B07B 7/00; B07B 7/086; B07B 11/06; B65G 69/18; B65G 69/188; B65G 69/02
See application file for complete search history.

(56) References Cited

U.S. PATENT DOCUMENTS

| | | | | |
|---|---|---|---|---|
| 1,367,635 A | * | 2/1921 | Sturtevant | ............... B07B 7/086 209/137 |
| 1,989,608 A | * | 1/1935 | Reed | ....................... E21B 33/03 166/75.13 |
| 3,483,973 A | * | 12/1969 | Jager | ....................... B07B 4/025 209/139.2 |

(Continued)

FOREIGN PATENT DOCUMENTS

JP      2014054598 A   *   3/2014     ............... F02C 7/22

*Primary Examiner* — Dung H Bui
(74) *Attorney, Agent, or Firm* — Coats & Bennett PLLC

(57) ABSTRACT

The present invention relates to a particle separator configured to be operatively connected between an enclosure hood and a ventilation system. In practice, an air stream containing particulate matter from an industrial process is directed through an enclosure hood, through the particle separator and into the ventilation system. Relatively large particles are removed from the air stream in the particle separator before the air stream reaches the ventilation system. This reduces the abrasion and general damage that can occur from relatively large particles moving through the duct structure of a ventilation system.

7 Claims, 3 Drawing Sheets

(56) References Cited

U.S. PATENT DOCUMENTS

| | | | | |
|---|---|---|---|---|
| 3,618,916 | A * | 11/1971 | Giorgi | C04B 7/36 |
| | | | | 432/58 |
| 3,626,672 | A * | 12/1971 | Burbidge | B01D 47/06 |
| | | | | 96/181 |
| 4,490,109 | A * | 12/1984 | Krutzner | B04C 5/24 |
| | | | | 432/106 |
| 4,927,438 | A * | 5/1990 | Mears | F24F 3/1607 |
| | | | | 454/56 |
| 5,453,049 | A * | 9/1995 | Tillman, Jr. | B01D 46/10 |
| | | | | 454/228 |
| 7,806,955 | B2 * | 10/2010 | Wang | B01D 19/0042 |
| | | | | 137/247.41 |
| 10,537,839 | B1 * | 1/2020 | Fleming | B01D 45/06 |
| 2008/0148477 | A1 * | 6/2008 | Shafik | E03C 1/122 |
| | | | | 4/679 |
| 2016/0045923 | A1 * | 2/2016 | Correia | F01D 5/081 |
| | | | | 55/392 |
| 2016/0090912 | A1 * | 3/2016 | Joshi | F02C 7/052 |
| | | | | 96/372 |
| 2016/0115916 | A1 * | 4/2016 | Kinsey, Jr. | B01D 46/2403 |
| | | | | 55/332 |
| 2016/0312698 | A1 * | 10/2016 | Judd | F02C 7/052 |
| 2016/0363051 | A1 * | 12/2016 | Snyder | F02C 7/052 |
| 2017/0138263 | A1 * | 5/2017 | Duge | B03C 3/0175 |
| 2018/0209340 | A1 * | 7/2018 | Renninger | B01D 45/14 |

* cited by examiner

US 10,744,436 B2

PARTICULATE SEPARATOR FOR THE REMOVAL OF LARGE PARTICULATE MATTER FROM VENTILATION SYSTEM AIR STREAMS

CROSS-REFERENCE TO RELATED APPLICATION

This application claims priority under 35 U.S.C. § 119(e) from the following U.S. provisional application: Application Ser. No. 62/457,231 filed on Feb. 10, 2017. That application is incorporated in its entirety by reference herein.

FIELD OF THE INVENTION

The present invention relates to industrial processes and to treating fugitive dust emissions from industrial processes and more particularly to processes for removing relatively large particles from fugitive dust emissions from industrial process equipment that tend to abrade or otherwise damage downstream duct structures that form a part of a ventilation system.

BACKGROUND

Abrasive particulate is particulate matter having aerodynamic diameters larger than approximately 20 micrometers. The abrasiveness of the particulate matter increases with the square of the particle diameter and proportional to the particle density and particle hardness. Particles in the range of 0.01 to more than 500 micrometers (aerodynamic) are released as fugitive emissions from a variety of process sources such as belt conveyors, bucket elevators, vibrating screens, and crushers. Although the fugitive dust is caught by a ventilation system hood, the abrasive particulate matter damages the equipment in the ventilation system by scouring the interior surfaces during transport through elbows, branch junctions, and other areas where the air stream is forced to change direction. Large particulate matter is encountered in industries in a variety of mineral processing sources such as crushed stone plants, sand and gravel processing facilities, roofing granule production facilities, Portland cement plants, and some glass manufacturing and wood products industry sources where solids have been cut, screened, transported, or crushed.

Common ventilation systems in place to protect workers in accordance with OSHA and MSHA exposure standards include hood enclosures over process equipment that are ducted to ventilation systems and eventually to particulate matter control systems for the removal of the particulate matter before release of the air stream to the environment. However, the air handling ductwork in these ventilation systems can be damaged by the abrasive particles. The abrasive dust creates holes in the ductwork which can decrease the effectiveness of the hoods and allow fugitive dust to remain entrained or become re-entrained in the plant environment near the process equipment. Depending on the material, abrasive particulate can damage ductwork to such an extent that some industries patch their systems on a regular basis and in severe cases require frequent, highly expensive duct replacement.

Ventilation system ducts constructed of abrasion-resistant steels and of abrasion-resistant duct lining have been found to be costly and short-term solutions. It is preferable to remove the damaging large particles prior to their entry to, and transport in the ventilation system ducts.

The separation of large particles prior to entry into the ventilation system is preferably done in a way that does not impose a large static pressure drop on the ventilation system. Alternative systems such as cyclones used as preseparators impose static pressure drops of 2 to 5 inches of water column, and most ventilation systems are not capable of handling this flow resistance without compromising other fugitive dust pick-up hoods in other parts of a large and complex ventilation system in the industrial facility. The particle separator disclosed here has a very low static pressure drop and can be easily retrofitted into most existing ventilation systems.

SUMMARY OF THE INVENTION

The present invention relates to a particle separator for moving relatively large particles (in one embodiment—50 micrometer and larger particles) from an air stream containing particulate matter emissions from an industrial process. By removing such large particles from the air stream upstream of a ventilation system, abrasion and other damage of interior duct surfaces of the ventilation system is reduced.

In one embodiment, the particle separator is disposed upstream of the ventilation system. To remove relatively large particles, the particle separator is configured and designed to separate the relatively large particles from the air stream through an inertial separation process. The particle separator includes a section that branches from or breaks off from a generally straight section. By maintaining a sufficient transport velocity through portions of the particle separator, the relatively large particles, through inertia, separate from the air stream and continue past the branch section while the air stream and relatively small particles are constrained to enter the branch section which leads to the ventilation system. By removing the relatively large particles before the air stream is directed into the ventilation system, abrasion and damage to the interior surfaces of the duct structure that forms a part of the ventilation system is reduced.

Further, the present invention relates to a method of removing relatively large particles from an air stream carrying particulate matter emissions from an industrial process. The method generally entails channeling or directing the air stream, including the relatively large particles from the industrial process, into the particle separator which is located upstream from the ventilation system. The particle separator, through an inertial separation process, causes the relatively large particles entrained in the air stream to depart the air stream as the air stream is sharply diverted into an angled branch section of the particle separator. To achieve this separation, the transport velocity of the air stream is maintained at a sufficient level that the inertia associated with the relatively large particles causes the large particles to bypass the angled branch section of the particle separator and to enter what is referred to as a return section of the particle separator. Meanwhile, the air stream and the relatively small particles entrained in the air stream are diverted through the branch section to the ventilation system. The relatively large particles separated from the air stream are collected in the return segment of the particle separator and, from time-to-time when sufficient amounts of the relatively large particles are collected, they are discharged from the particle separator.

Other objects and advantages of the present invention will become apparent and obvious from a study of the following description and the accompanying drawings which are merely illustrative of such invention.

DESCRIPTION OF EXEMPLARY EMBODIMENTS

The present invention relates to a particle separator used to remove relatively large particles from an air stream. It is particularly useful in removing large particles from particulate matter emissions from material handling equipment. That is, some industrial equipment, when in use, produces dust emissions that include particulate matter that must be removed from the workplace. Ventilation systems are used to protect workers in accordance with OSHA and MSHA exposure standards. In a typical system, an enclosure hood is mounted over process equipment, such as, for example, conveyors, screening systems, crushers, bucket elevators and other material handling equipment. See FIG. 2. Particulate matter in the area of such equipment or industrial processes is induced via an air stream through an enclosure hood and directed into the ventilation system. Since ventilation systems include a duct structure, large particles that form a part of the particulate matter tend to abrade and damage the interior surfaces of the duct structure. By interposing the particle separator of the present invention between the enclosure hood and the ventilation system, large particles on the order of 50 micrometers or larger are separated from the air stream prior to reaching the ventilation system.

Figure 1:
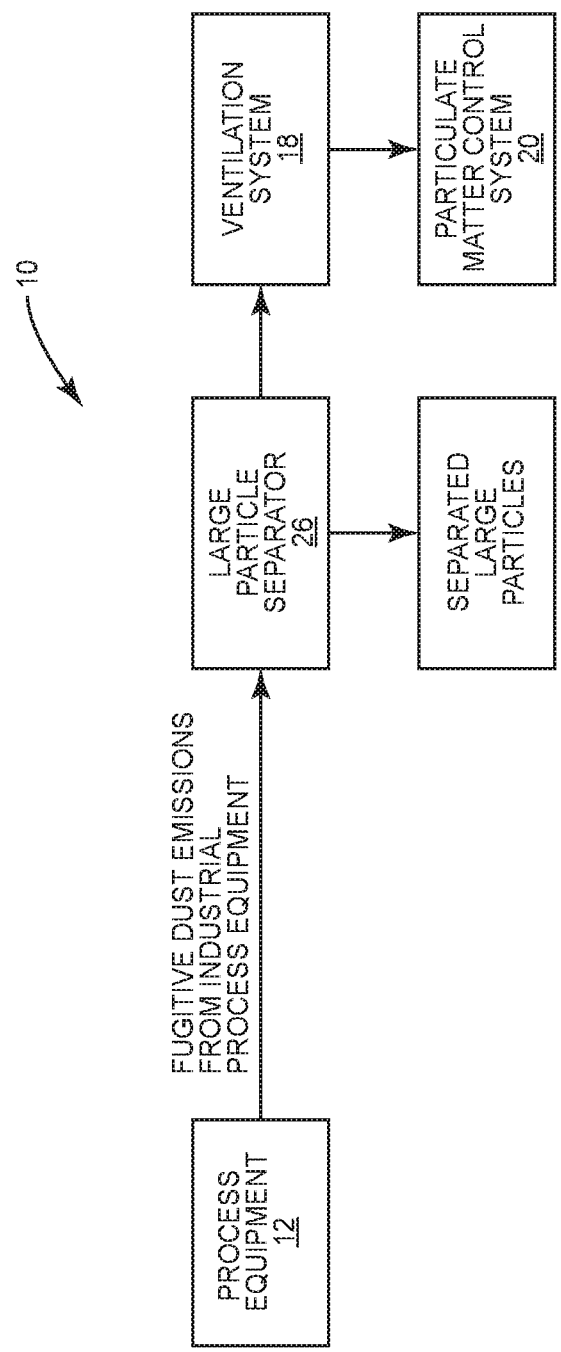
FIG. 1 is a schematic block diagram illustrating a process for removing relatively large particles from an air stream containing fugitive dust emissions produced by industrial equipment.

FIG. 1 shows an overview of a system 10 for treating an air stream containing particulate matter from an industrial process. System 10 includes process equipment 12 such as that referred to above. This process equipment, as it is operated in an environment where workers are found, produces fugitive dust emissions. System 10 includes a fan downstream from the process equipment 12 which, through a negative pressure, causes fugitive emissions to be entrained in an air stream. The air stream and the entrained particulate matter are induced through an enclosure hood that generally covers the process equipment 12. From the enclosure hood, the air stream containing relatively large particles and relatively small particles is directed to the particle separator 26 which is referred to above and discussed subsequently herein in detail. There, as explained below, the relatively large particles entrained in the air stream are separated from the air stream. After separating the relatively large particles from the air stream, the air stream is diverted through a branch section of the particle separator 26 to a ventilation system 18. From the ventilation system 18, the air stream is directed to a particulate matter control system 20 where the particulate matter is removed from the air stream prior to the air stream being released to the environment.

Figure 2:
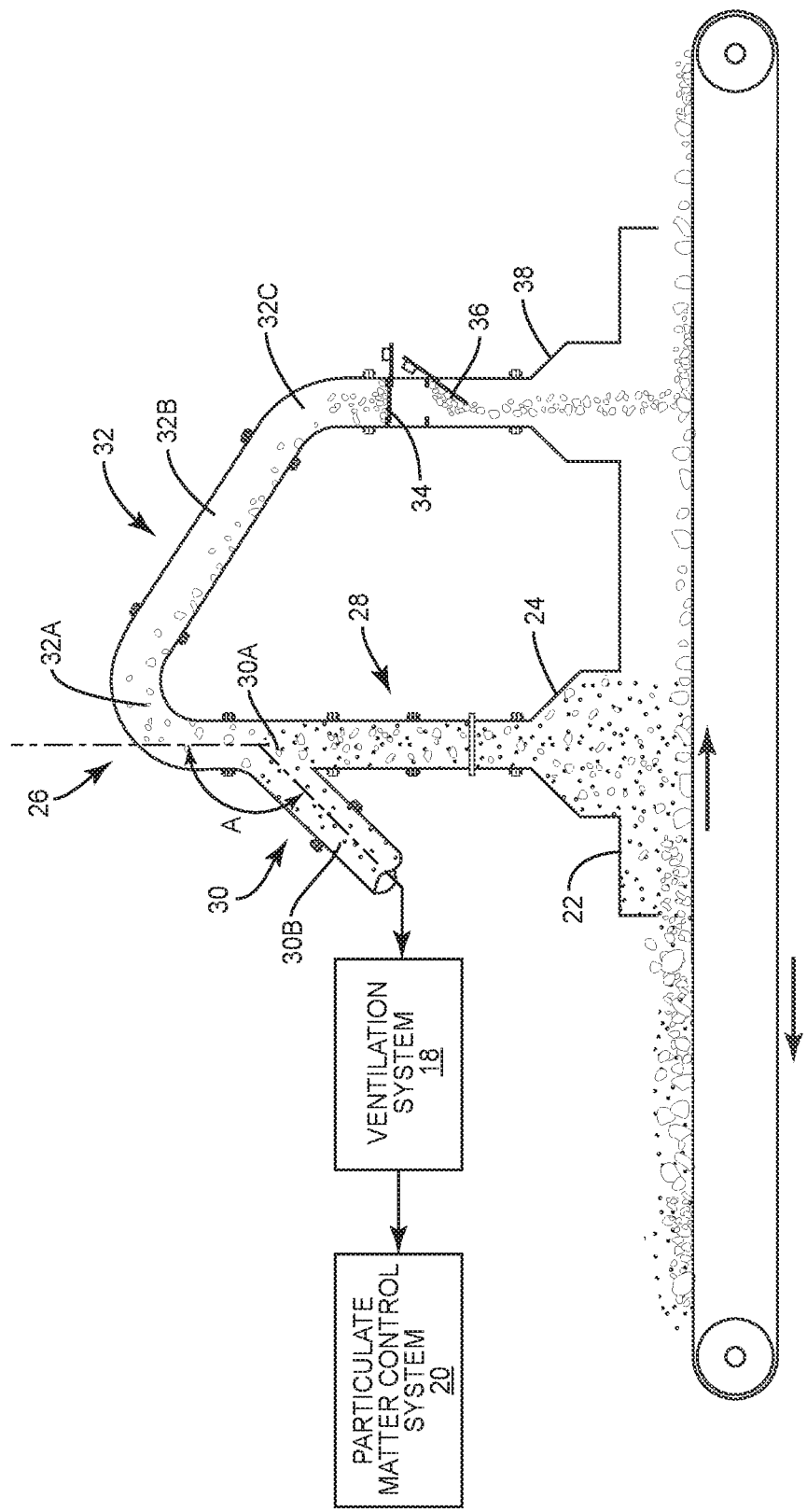
FIG. 2 is a schematic illustration showing a portable separator interposed between industrial equipment and a ventilation system for removing relatively large particles from an air stream containing fugitive dust emissions produced by the industrial equipment.
Figure 3:
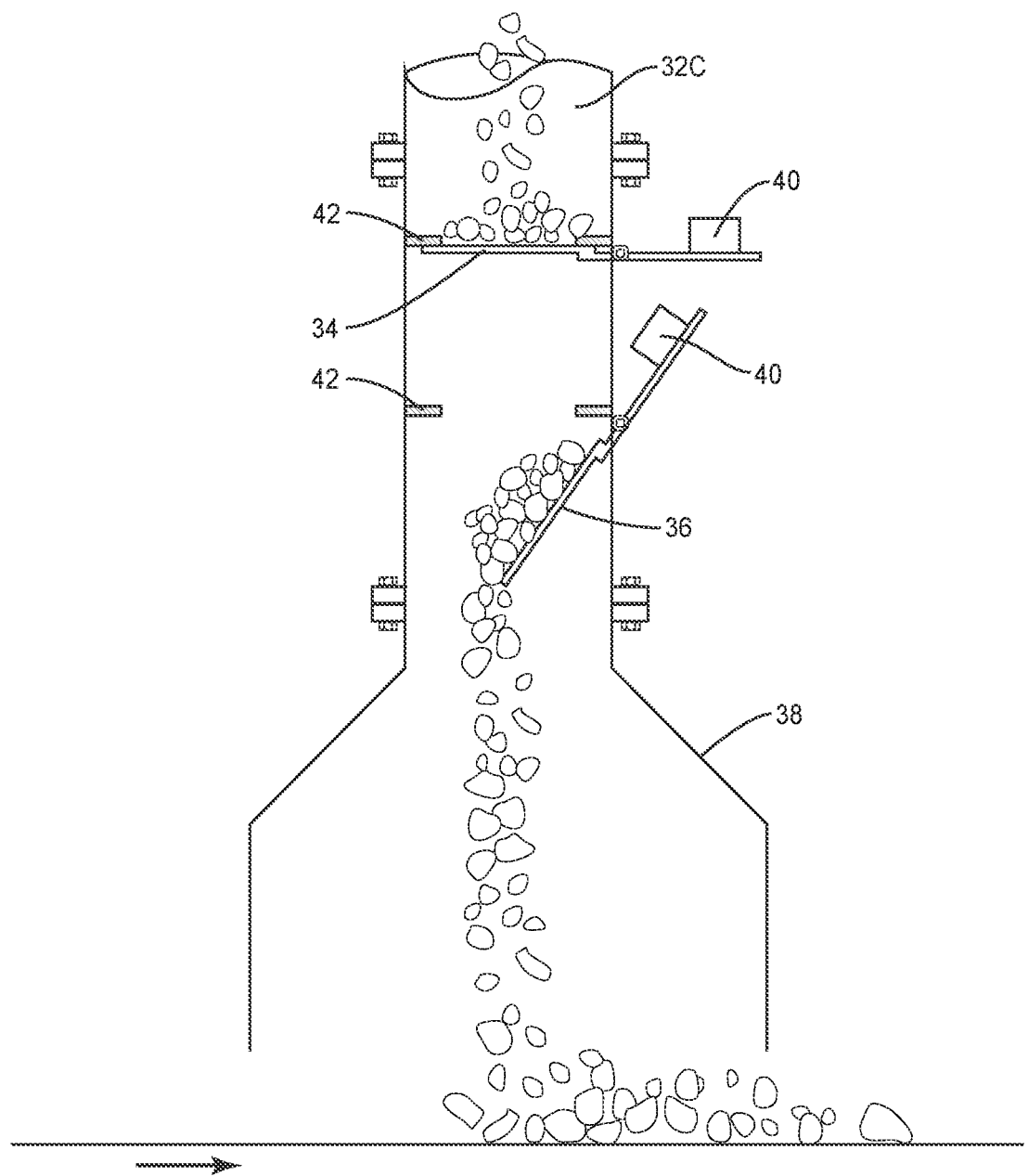
FIG. 3 is a schematic illustration showing the swing gates and illustrating how the relatively large particles are accumulated in the return segment of the particle separator.

With reference to FIG. 2, an industrial process or industrial equipment is schematically shown therein. In the example shown in FIG. 2, the process equipment includes a conveyor that conveys material, such as crushed stone, for example. Disposed over the industrial equipment or an industrial process is an enclosure hood 22. Note that the enclosure hood 22 includes a tapered opening 24 that leads to the particle separator indicated generally by the numeral 26. A system of air (or air stream) is formed or induced through the enclosure hood 22 and from there through the tapered entry 24 and into the particle separator 26. This system of air includes the fugitive dust emissions that include particulate matter that typically include relatively small particles to large particles that range in size from 0.01 to more than 500 micrometers (aerodynamic). As described below, the particle separator 26 is configured to remove relatively large particles from the air stream prior to the air stream reaching the ventilation system 18. Particle separator 26 includes a number of structural and functional features that combine to facilitate the separation of relatively large particles from the air stream. These different functional and structural features are sometimes described in terms of "segments". The term "segments" is not used to identify structural parts or detachable structural portions of the particle separator 26. That is, the particle separator 26 can be a unitary structure and the reference to "segments" does not mean that these areas of the particle separator 26 are separate parts. The entire particle separator 26 can be a single unitary structure.

In any event, particle separator 26 includes three segments: an entry segment 28, a Y-segment 30 and a return segment 32. Entry segment 28 forms the inlet to the particle separator 26. In particular, the entry segment 28 is configured to be operatively connected to the top of the enclosure hood 22.

Extending from the entry segment 28 is the Y-segment 30. Y-segment 30 includes a relatively straight section 30A and a branch section 30B. Note that the branch section 30B abruptly turns from the relatively straight section 30A. As illustrated in FIG. 2, an angle A is defined between the branch section 30B and the relatively straight section 30A. Note in FIG. 2, in one embodiment, where the branch section 30B actually angles back with respect to the direction of the air stream. Angle A can vary. In some embodiments, angle A between the relatively straight section 30A and the branch section 30B will include an angle of approximately 90-135°.

Particle separator 26 is designed and configured to direct the air stream, including at least some of the particulate matter, from the Y-segment 30 into the branch section 30B. Note that the branch section 30B is communicatively connected to the ventilation system 18. Again, this means that the air stream moves through the enclosure hood 22 and through the tapered entry 24 into the inlet of the Y-segment 30 and then turns so as to be directed through the branch section 30B.

As discussed above, the concern is to remove relatively large particles from the air stream before the relatively large particles can reach the duct structure of the ventilation system 18. This reduces or minimizes abrasion and damage to the interior surfaces of the duct structure due to the relatively large particles impinging on the walls of the duct. To achieve this, the particle separator 26 relies on inertial separation. By maintaining a sufficient air stream transport velocity into the inlet of the Y-segment 30, the inertia of the relatively large particles tends to cause the relatively large particles to separate from the air stream and continue past the inlet to the branch section 30B. Here the term "relatively large particles" means particles of 50 micrometers (aerodynamic) and larger.

It is hypothesized that the transport velocity of the air stream entering the Y-segment 30 should be at least 3200 feet per minute. In one embodiment, this transport velocity is preferably in the range of 3500-4500 feet per minute. Generally, the transport velocity should not exceed 6000 feet per minute.

Communicatively connected to the generally straight section 30A of the Y-segment 30 is a return segment 32. See FIG. 2. Return segment 32 functions to receive the separated relatively large particles. In particular, the return segment 32 includes a curved section 32A, a gravity transfer section 32B and a particle accumulation section 32C. Thus, as viewed in FIG. 2, the relatively large particles separated from the air stream are effectively shot into the return segment 32. There the relatively large particles pass through the curved section 32A and reach the gravity transfer section 32B. There the relatively large particles move and are transferred by gravity down the gravity transfer section 32B to the particle accumulation section 32C.

In the particle accumulation section 32C, there is provided means for accumulating and retaining the relatively large particles separated from the air stream. Various means can be employed to retain and cause the relatively large particles to be accumulated. For example, the particle accumulation section 32C can be provided with a valve structure that is normally closed. When normally closed, the relatively large particles accumulate upstream of the valve structure and at selected or pre-determined times, the accumulated large particles are discharged from the particle accumulation section 32C into an expanded discharge shroud 38 where the particles are returned downstream from the inlet of the enclosure hood. It should be noted that the relatively large particles are discharged downstream from the opening in the enclosure hood 22. This assures that the separated large particles are not re-introduced into the air stream.

In one particular embodiment, the particle accumulation section 32C includes a pair of spaced apart swing gates 34 and 36 which are pivotally mounted and are normally disposed in a closed position. See FIG. 3. When closed, the swing gates 34 and 36 retain the particles in the accumulation section 32C. In this particular embodiment, the swing gates 34 and 36 include an extension ledge that includes an adjustable counterweight 40. See FIG. 3. Once the weight of accumulated particles on either of the swing gates reaches a certain weight, the counterweight is overcome and the gate swings open, causing the accumulated particles to move to the lower swing gate or to be discharged, depending on which swing gate is actually actuated. In particular, accumulated particles on the lower swing gate 36 are discharged by the swing gate pivoting downwardly, causing the accumulated particles to fall through the expanded shroud 38 that is disposed over a downstream side of the process hood enclosure 22. These large particles are returned to the process material stream being conveyed underneath the enclosure hood 22. The distance between the center line of the entry segment 28 and the center line of the return expansion section 38 should be greater than 24 inches to prevent recapture of the large particles into the entry segment 28.

During the course of separating the relatively large particles from the air stream, the swing gates 34 and 36 are closed. Hence, relatively large particles are accumulating on one or both swing gates at any one time. With the swing gates being closed, no air flow or substantially no air flow is flowing through the return segment 32. The movement of the relatively large particles through the return segment 32 is due to inertia and gravity. Note in FIG. 3 where the swing gates 34 and 36, when closed, abut against upward disposed seals 42. Because of the negative pressure existing in the particle separator 26, the swing gates 34 and 36 tend to be induced or biased against the seals 42.

It is desirable for the tapered entry 24, entry segment 28 and portions of the Y-segment 30 and initial portions of the return segment 32 to be constructed of abrasion resistant material, such as abrasion resistant steel or abrasion resistant interior linings. These segments of the particle separator 26 generally incur more abrasion due to turbulent flow conditions in these portions or segments of the particle separator 26.

Large particle removal tests conducted using glass microspheres with a known density and a range of sizes of 5 to 70 micrometers were conducted using a particle separator with a branch section 30B angled 135 degrees downward. See FIG. 2. The particles introduced into the particle separator 26 had aerodynamic diameters ranging from 7 to 98 micrometers. A comparison of the charged particulate matter size distribution and the return segment particulate matter size distribution indicated the following capture efficiencies for large particulate matter.

TABLE 1

| 50% Cut Size, Micrometers (Aerodynamic) | |
|---|---|
| Velocity at Entry to Y-Segment, feet per minute | 50% Cut Size, Micrometers Average of three tests |
| 2400-2700 | 60 to 70 |
| 3200-3700 | 45 to 50 |
| 4200-4600 | 40 to 50 |

The tests demonstrated the ability to remove particles having aerodynamic diameters of 45 to 50 micrometers with an efficiency of 50%. Higher removal efficiencies are achieved for particles larger than the indicated 50% cut size. This efficiency is sufficient to reduce or minimize the concentration of large particles that cause (1) severe abrasion of ventilation system elbows and branch entry sections and (2) contribute to solids accumulation due to gravity settling in ventilation system ducts where the transport velocity decreases below approximately 3,500 feet per minute.

Static pressure drop tests of the present invention from the point of entry into the tapered entry 24 to the outlet of the branch section 30B indicate a static pressure drop of 0.4 to 0.9 inches water column over the range of 3,200 to 4,500 feet per minute in the entry segment 28 of the particle separator 26. This low static pressure drop across the particle separator 26 is desirable with respect to the ability to retrofit the particle separator 26 into existing ventilation system process hood enclosures and the associated ventilation system. In any event, it is desirable to maintain the static pressure drop across the particle separator 26 at 1.0 or less inches of water column.

In describing the particle separator 26, reference is made to removing the relatively large particles which are defined as those particles 50 micrometers or larger (aerodynamic).

This does not suggest that removing means removing all such particles. As used herein, the reference to removing relatively large particles means removing approximately 50% or more of the relatively large particles in the air stream.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method for capturing fugitive particulate matter emissions from an industrial process comprising:
   a. directing a system of air in the vicinity of the industrial process and entraining the fugitive particulate matter from the industrial process into the system of air and wherein the particulate matter includes particles of 50 micrometers and larger;
   b. directing the system of air containing the particulate matter into a particle separator;
   c. preventing or reducing abrasion in a duct structure of a ventilation system located downstream of the particle separator by removing the 50 micrometer and larger particles from the air stream in the particle separator before the air stream reaches the ventilation system, the method of removing the 50 micrometer or larger particles including:
      i. in the particle separator, directing the air stream into and through a Y-segment having a generally straight section and a branch section that is angled off the generally straight section;
      ii. inertially separating the 50 micrometer micron and larger particles from the air stream by directing the air stream in the Y-segment into the branch section of the Y-segment while causing the 50 micrometer and larger particles to bypass the branch section and pass through the generally straight section, thereby separating the 50 micrometer and larger particles from the air stream;
      iii. directing the separated 50 micrometer and larger particles from the generally straight section of the Y-segment into a return segment that is operatively connected to the generally straight section of the Y-segment and wherein the return segment includes a gravity transfer section;
      iv. transferring by gravity the separated 50 micrometer or larger particles through the gravity transfer section to a discharge area; and
      v. discharging the separated 50 micrometer or larger particles from the particle separator wherein a hood is disposed over the industrial process and the system of air is induced into the hood and directed therefrom upwardly into the particle separator disposed over the hood; including directing the separated 50 micrometer and larger particles upwardly through the generally straight section of the Y-segment into a curved portion of the return segment where the separated 50 micrometer or larger particles travel around the curved section prior to reaching the gravity transfer section of the return segment.

2. The method of claim 1 further including directing substantially the entire air stream into and through the branch section of the Y-segment and during the separation of the 50 micrometer and larger particles, limiting air flow through the return segment.

3. The method of claim 1 including maintaining the transport velocity of the air stream passing through the Y-segment at least at 3,200 feet per minute.

4. The method of claim 1 including maintaining the transfer velocity of the air stream through the Y-segment between 3,200 feet per minute and 6,000 feet per minute.

5. The method of claim 1 including substantially changing the direction of the air stream in the Y-segment by directing the air stream into the branch section which is disposed at an angle A of at least 90° with respect to the generally straight section.

6. The method of claim 1 including accumulating the separated 50 micrometer or larger particles in the particle separator and, after accumulating an amount of the separated 50 micrometer or larger particles, discharging the accumulated 50 micrometer and larger particles.

7. The method of claim 1 including limiting the static pressure drop between an inlet to the particle separator and an outlet of the branch section to 1.0 inches of water column and less.

\* \* \* \* \*